United States Patent
Yang et al.

(10) Patent No.: US 10,998,572 B2
(45) Date of Patent: May 4, 2021

(54) CARBON-SULFUR COMPLEX, METHOD FOR PRODUCING SAME, AND CATHODE AND LITHIUM-SULFUR BATTERY COMPRISING SAME

(71) Applicants: LG CHEM, LTD., Seoul (KR); SOGANG UNIVERSITY RESEARCH FOUNDATION, Seoul (KR)

(72) Inventors: Seungbo Yang, Daejeon (KR); Eunkyung Cho, Daejeon (KR); Jun Hyuk Moon, Seoul (KR); Kwonnam Sohn, Daejeon (KR); Doo Kyung Yang, Daejeon (KR); Donghee Gueon, Seoul (KR)

(73) Assignees: LG CHEM, LTD., Seoul (KR); SOGANG UNIVERSITY RESEARCH FOUNDATION, Seoul (KR)

( * ) Notice: Subject to any disclaimer, the term of this patent is extended or adjusted under 35 U.S.C. 154(b) by 135 days.

(21) Appl. No.: 16/094,440

(22) PCT Filed: Feb. 28, 2018

(86) PCT No.: PCT/KR2018/002496
§ 371 (c)(1),
(2) Date: Oct. 17, 2018

(87) PCT Pub. No.: WO2018/164413
PCT Pub. Date: Sep. 13, 2018

(65) Prior Publication Data
US 2019/0123377 A1    Apr. 25, 2019

(30) Foreign Application Priority Data
Mar. 7, 2017    (KR) ........................ 10-2017-0029004

(51) Int. Cl.
*H01M 10/52* (2006.01)
*H01M 4/58* (2010.01)
(Continued)

(52) U.S. Cl.
CPC ....... *H01M 10/052* (2013.01); *H01M 4/0471* (2013.01); *H01M 4/13* (2013.01);
(Continued)

(58) Field of Classification Search
CPC .. H01M 4/136; H01M 4/1397; H01M 4/5815; H01M 4/0471; H01M 4/13;
(Continued)

(56) References Cited

U.S. PATENT DOCUMENTS

2004/0058246 A1    3/2004    Choi et al.
2013/0273460 A1    10/2013    Moon et al.
(Continued)

FOREIGN PATENT DOCUMENTS

KR    10-2004-0026207 A    3/2004
KR       10-1195912 B1      10/2012
(Continued)

OTHER PUBLICATIONS

Lee, J. S., et al. "Sulfur-Immobilized, Activated Porous Carbon Nanotube Composite Based Cathodes for Lithium-Sulfur Batteries", Small, vol. 13, 1602984, published Jan. 11, 2017. (Year: 2017).*
(Continued)

*Primary Examiner* — Miriam Stagg
*Assistant Examiner* — Lilia Nedialkova
(74) *Attorney, Agent, or Firm* — Birch, Stewart, Kolasch & Birch, LLP

(57) ABSTRACT

A carbon-sulfur composite including a carbon aggregate and sulfur, a method for preparing the same, and a positive electrode and a lithium-sulfur battery including the same.

14 Claims, 8 Drawing Sheets

(51) Int. Cl.

| | | |
|---|---|---|
| *H01M 4/13* | (2010.01) | |
| *H01M 4/38* | (2006.01) | |
| *H01M 4/136* | (2010.01) | |
| *H01M 4/139* | (2010.01) | |
| *H01M 4/04* | (2006.01) | |
| *H01M 4/62* | (2006.01) | |
| *H01M 4/1397* | (2010.01) | |
| *H01M 4/02* | (2006.01) | |
| *H01M 10/052* | (2010.01) | |

(52) U.S. Cl.
CPC .......... *H01M 4/136* (2013.01); *H01M 4/139* (2013.01); *H01M 4/1397* (2013.01); *H01M 4/38* (2013.01); *H01M 4/382* (2013.01); *H01M 4/5815* (2013.01); *H01M 4/622* (2013.01); *H01M 4/625* (2013.01); *H01M 2004/021* (2013.01); *Y02E 60/10* (2013.01); *Y02T 10/70* (2013.01)

(58) Field of Classification Search
CPC ........ H01M 4/139; H01M 4/38; H01M 4/382; H01M 4/622; H01M 4/625; H01M 10/052; H01M 2004/021; Y02E 60/10; Y02P 70/50; Y02T 10/70
See application file for complete search history.

(56) References Cited

U.S. PATENT DOCUMENTS

| | | |
|---|---|---|
| 2014/0050973 A1 | 2/2014 | Manthiram et al. |
| 2014/0234702 A1 | 8/2014 | Zhang et al. |
| 2015/0303457 A1 | 10/2015 | Wang et al. |
| 2015/0311489 A1 | 10/2015 | Park et al. |
| 2016/0049656 A1 | 2/2016 | Laicer et al. |
| 2016/0248087 A1 | 8/2016 | Kim et al. |
| 2016/0372807 A1 | 12/2016 | Kim et al. |
| 2017/0047584 A1 | 2/2017 | Hwang et al. |
| 2017/0110719 A1 | 4/2017 | Wang et al. |
| 2017/0170458 A1 | 6/2017 | Moon |

FOREIGN PATENT DOCUMENTS

| | | | |
|---|---|---|---|
| KR | 10-2014-0082994 A | 7/2014 | |
| KR | 10-2015-0045363 A | 4/2015 | |
| KR | 10-2015-0045484 A | 4/2015 | |
| KR | 10-2015-0061874 A | 6/2015 | |
| KR | 10-2015-0124301 A | 11/2015 | |
| KR | 10-2015-0128592 A | 11/2015 | |
| KR | 10-2016-0024326 A | 3/2016 | |
| KR | 10-2016-0037084 A | 4/2016 | |
| KR | 10-2016-0134092 A | 11/2016 | |
| KR | 10-2016-0145605 A | 12/2016 | |
| KR | 10-2016-0149103 A | 12/2016 | |
| WO | WO-2015056925 A1 * | 4/2015 | ............ H01M 4/382 |
| WO | WO 2015/139660 A1 | 9/2015 | |

OTHER PUBLICATIONS

Ji, X., et al. "A highly ordered nanostructured carbon-sulfur cathode for lithium-sulfur batteries", Nature Materials, vol. 8, pp. 500-506 , published May 17, 2009. (Year: 2009).*

Ji, L. et al. "Porous hollow carbon nanotube composite cages", Chemical Cummunications, pp. 1206-1208, published Feb. 6, 2006. (Year: 2006).*

Gueon et al., "Spherical Macroporous Carbon Nanotube Particles with Ultrahigh Sulfur Loading for Lithium-Sulfur Battery Cathodes", ACS Nano, vol. 12, 2018, pp. 226-233.

International Search Report for PCT/KR2018/002496 (PCT/ISA/210) dated Jun. 11, 2018.

Liang et al,, "Hierarchically Structured Sulfur/Carbon Nanocomposite Material for High-Energy Lithium Battery", Chemistry of Materials, vol. 21, 2009, pp. 4724-4730.

Manthiram et al., "Rechargeable Lithium-Sulfur Batteries", Chemical Reviews, vol. 114, 2014, pp. 11751-11787.

Strubel et al., "ZnO Hard Templating for Synthesis of Hierarchical Porous Carbons with Tailored Porosity and High Performance in Lithium-Sulfur Battery", Advanced Functional Materials, vol. 25, 2015, pp. 287-297.

Extended European Search Report, dated Mar. 4, 2019, for corresponding European Application No. 18764724.3.

Xu et al., "Mesoporous Carbon-Carbon Nanotube-Sulfur Compolte Microspheres for High-Areal-Capacity Lithium-Sulfur Battery Cathodes," Applied Materials & Interfaces, vol. 5, 2013 (Published Oct. 3, 2013), pp. 11355-11362, XP055559994.

* cited by examiner

CARBON-SULFUR COMPLEX, METHOD FOR PRODUCING SAME, AND CATHODE AND LITHIUM-SULFUR BATTERY COMPRISING SAME

TECHNICAL FIELD

This application claims the benefit of priority based on Korean Patent Application No. 10-2017-0029004, filed Mar. 7, 2017, and all the contents disclosed in the literatures of the corresponding Korea patent applications are included as a part of the present specification.

The present invention relates to a carbon-sulfur composite having sulfur impregnated into a carbon aggregate, a method for preparing the same, a positive electrode and a lithium-sulfur battery including the same.

BACKGROUND ART

As electronic goods, electronic devices, communication devices and the like have rapidly become smaller and lighter recently, and necessity of electric vehicles has highly emerged regarding environmental problems, demands for improving performance of secondary batteries used as a power source of these goods have increased. Among these, lithium secondary batteries have received considerable attention as a high performance battery due to their high energy density and high standard electrode potential.

Particularly, lithium-sulfur (Li—S) batteries are a secondary battery using a sulfur series material having sulfur-sulfur bonds as a positive electrode active material, and using lithium metal as a negative electrode active material. Sulfur, a main material of a positive electrode active material, has advantages of being very abundant in resources, having no toxicity and having a low atomic weight. In addition, a lithium-sulfur battery has theoretical discharge capacity of 1,675 mAh/g-sulfur and theoretical energy density of 2,600 Wh/kg, which is very high compared to theoretical energy density of other battery systems (Ni-MH battery: 450 Wh/kg, Li—FeS battery: 480 Wh/kg, Li—$MnO_2$ battery: 1,000 Wh/kg, Na—S battery: 800 Wh/kg) currently studied, and therefore, is a most promising battery among batteries that have been developed so far.

During a discharge reaction of a lithium-sulfur battery, an oxidation reaction of lithium occurs in a negative electrode (anode), and a reduction reaction of sulfur occurs in a positive electrode (cathode). Sulfur has a cyclic S8 structure before discharge, and electric energy is stored and produced using an oxidation-reduction reaction in which an oxidation number of S decreases as S—S bonds are broken during a reduction reaction (discharge), and an oxidation number of S increases as S—S bonds are formed again during an oxidation reaction (charge). During such a reaction, the sulfur is converted to linear-structured lithium polysulfide ($Li_2S_x$, x=8, 6, 4 and 2) from cyclic S8 by the reduction reaction, and as a result, lithium sulfide ($Li_2S$) is lastly produced when such lithium polysulfide is completely reduced. By the process of being reduced to each lithium polysulfide, a discharge behavior of a lithium-sulfur battery shows gradual discharging voltages unlike lithium ion batteries.

However, in such a lithium-sulfur battery, problems of low electric conductivity of sulfur, lithium polysulfide elution and volume expansion problem during charge and discharge and low coulombic efficiency caused therefrom, and a rapid capacity decrease caused from charge and discharge need to be resolved.

Porous carbon-sulfur composite materials have been much developed as an electrode material of a lithium-sulfur battery in the art, and a pore structure of a porous carbon material has been normally prepared as a single structure of mesopores advantageous for preventing lithium polysulfide elution in the art, however, when used in an actual battery, a hierarchical porosity structure enhancing electrochemical properties by facilitating sulfur composition and sulfur utilization is advantageous for a lithium-sulfur battery.

In order to prepare such a porous carbon structure, the use of a template has been proposed in the art, and as such a template, globular silica or a colloidal crystalline array based on an ordered aggregate of latex polymer nanoparticles has been used. In addition, an ordered mesoporous M41S silica material is manufactured using a micelle array of surfactant molecules as a structure-directing agent for silica polymerization. Meanwhile, despite a recent attempt to synthesize carbon having regularly ordered porosity through a template copy using zeolite, mesoporous materials and colloidal crystals, the pores in these carbon structures have not been distributed in a regularly ordered manner.

Preparation of such a hierarchical porosity structure requires a complicated process, and preparation of a hierarchical porosity-type carbon material for a lithium-sulfur battery through mass production and a simple single process from a commercial point of view are still in the process of development.

DISCLOSURE

Technical Problem

As described above, a method of synthesizing hierarchical porosity structure material has a disadvantage of being prepared using a very complicated method and having a low yield, which causes a problem of decreased productivity.

Accordingly, an aspect of the present invention provides a carbon-sulfur composite having a hierarchical porosity structure.

Another aspect of the present invention provides a simplified process compositing a carbon aggregate having a hierarchical porosity structure and sulfur using a single process.

Technical Solution

According to an aspect of the present invention, there is provided a carbon-sulfur composite including a carbon aggregate having a hierarchical porosity structure comprised with pores interconnected three-dimensionally and ordered; and sulfur introduced to at least a part of an external surface and an inside of the carbon aggregate.

According to another aspect of the present invention, there is provided a method for preparing a carbon-sulfur composite including i) preparing a dispersion in which template particles and a cylindrical carbon material are mixed; ii) preparing a template particle-carbon composite by spray drying the dispersion; iii) preparing a carbon aggregate by heat treating the template particle-carbon composite; and iv) preparing a carbon-sulfur composite by impregnating sulfur into the carbon aggregate.

According to another aspect of the present invention, there is provided a positive electrode including the carbon-sulfur composite.

According to another aspect of the present invention, there is provided a lithium-sulfur battery including the positive electrode.

Advantageous Effects

When using a carbon-sulfur composite having a hierarchical porosity structure as a positive electrode material of a lithium-sulfur battery according to the present invention, a specific surface area increases due to a hierarchical porosity structure including macropores securing an electron migration path and enhancing electron conductivity, and as a result, electrode capacity is enhanced.

In addition, sulfur, a positive electrode active material, is uniformly loaded, and a contact area of the sulfur is expanded as well, and therefore, carbon and sulfur are not separated even when the sulfur is swollen by an electrolyte liquid even with a high loading amount per unit area. As a result, an outflow of the sulfur to an electrolyte can be reduced, and electrode stability and battery performance can be enhanced.

In addition, when preparing a carbon-sulfur composite, there is an advantage in that pore sizes are readily controlled and mass production can be simple using a one-step process through a spray drying method.

BEST MODE

Figure 1:
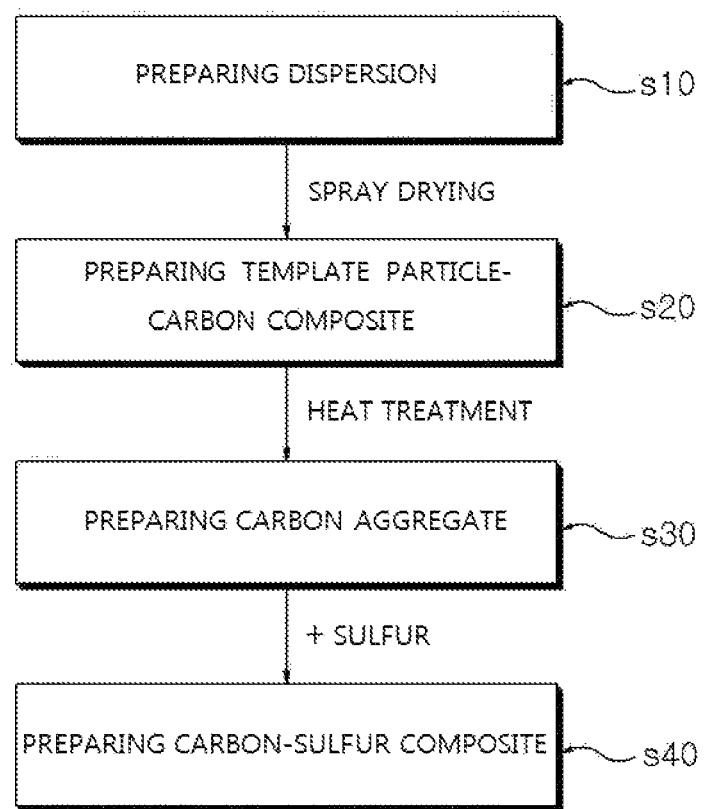
FIG. 1 is a flow chart of a method for preparing a carbon-sulfur composite according to the present invention.

Hereinafter, the present invention will be described in detail.

Carbon-Sulfur Composite

The present invention provides a carbon-sulfur composite having sulfur introduced to at least a part of an external surface and an inside of a carbon aggregate having a hierarchical porosity structure.

In the present invention, the hierarchical porosity structure means a structure having both mesopores (2 nm to 50 nm) and macropores (>50 nm), and having pores with different sizes ordered so as to be interconnected three-dimensionally.

Herein, the three-dimensional structure may mean intersecting points at which two or more strands cross distributing three-dimensionally.

In addition, the three-dimensional structure may mean each of basic units entangled two-dimensionally being three-dimensionally entangled again to ultimately have a three-dimensional structure. The "entangled" may mean two or more strands crossing each other through a physical contact.

In the present invention, a cylindrical carbon material aggregates to form an aggregate having a hierarchical porosity structure, and the aggregate has a structure in which template particles having a certain size or larger, preferably, macropores, are requisitely included, and the macropores are well-ordered and interconnected.

The macropores are formed through forming pores by the carbon material having a cylindrical shape aggregating each other, and removing follow-up template particles. Such macropores are preferably 50 nm or greater, preferably from 300 nm to 800 nm, more preferably from 400 nm to 700 nm, and most preferably from 500 nm to 600 nm. Particularly, by the macropores being ordered in one direction, electron tunneling and electron path are possible on the surface and the inside of the carbon-sulfur composite particles.

In addition to such macropores, mesopores may also be present at the same time. The mesopores means being 50 nm or less, and preferably from 3 nm to 50 nm. For example, pores formed between carbon nanotubes among the cylindrical carbon material may correspond to mesopores of approximately 4 nm, and pores between carbon nanotube particles may correspond to mesopores of approximately 10 nm to 50 nm.

In addition, pores of the cross section of the cylindrical carbon material and voids formed between a plurality of the cylindrical carbon materials from these being entangled may correspond to mesopores, however, numerical ranges thereof may be controlled from differences in the size of each cylindrical carbon material and preparation processes.

These macropores and mesopores being present at the same time facilitates sulfur loading and electrolyte penetration, and by having a uniform sulfur loading effect and facilitating electrolyte penetration, capacity properties may be secured at a high C-rate.

The cylindrical carbon material means a carbon material having a rod-type or a cylindrical structure empty inside growing in one direction rather than a spherical particle or a flake form. Through such a cylindrical structure instead of a spherical particle, macropores ordered in one direction may be readily formed. In other words, a spherical carbon material (for example, carbon black and the like) that is not a cylindrical carbon material may be considered as a raw material for preparing the carbon aggregate, however, macropores linked to each other three-dimensionally and well-ordered are not readily formed using the spherical carbon material herein. The cylindrical carbon material preferably has a nanostructure, and specifically, carbon nanotubes (CNT), graphite nanofibers (GNF), carbon nanofibers (CNF) or activated carbon fibers (ACF) may be used, and carbon nanotubes may be preferably used. In addition, single-walled carbon nanotubes (SWCNT) or multi-walled carbon nanotubes (MWCNT) may all be used as the carbon nanotubes, and depending on the preparation method, any one, two or more forms selected from the group consisting of a spherical type, an entangled type and a bundle type are obtained.

The carbon aggregate indicates spherical or oval particles formed in a network structure by a number of a plurality of cylindrical carbon materials being crosslinked or entangled with each other, and a diameter of the cross section of each cylindrical carbon material forming the carbon aggregate may be from 1 nm to 100 nm, specifically 1 nm to 50 nm, and more specifically 1 nm to 10 nm.

Herein, a diameter of the carbon aggregate, an assembly of a plurality of cylindrical carbon materials, may be from 1 μm to 500 μm, specifically from 1 μm to 100 μm, more specifically from 1 μm to 50 μm, and even more specifically from 1 μm to 10 μm. The diameter of the carbon aggregate means the largest value of the diameter of the cross section of the aggregate. The diameter of the carbon aggregate according to one embodiment of the present invention is from 4 μm to 7 μm. The carbon aggregate diameter being less than 1 μm has a problem in that securing a specific surface area for impregnating sulfur is difficult since hierarchical pore distribution is not diverse, and when the diameter is greater than 500 μm, voids between particles are present much as electrode uniformity decreases leading to a decrease in the sulfur content, and a decrease in the contact area with a current collector is resulted. Therefore, in order to provide proper voids and electrode uniformity, the carbon aggregate preferably has a diameter of 500 μm or less.

In the carbon aggregate according to the present invention, pores having different sizes are interconnected three-dimensionally, and particularly, by including well-ordered macropores, a high porosity is obtained compared to having simply mesopores only. Preferably, the carbon aggregate may include 10% to 70%, and more specifically 10% to 40% porosity based on the total volume of the aggregate. Using the carbon aggregate having a porosity in the above-mentioned range is preferred in forming a carbon-sulfur composite.

In addition, a high level of porosity means an increase in the specific surface area. Specifically, the carbon aggregate of the present invention has a specific surface area, which is measured using a BET method, of 50 $m^2/g$ to 1000 $m^2/g$, preferably 100 $m^2/g$ to 500 $m^2/g$, and more preferably 200 $m^2/g$ to 300 $m^2/g$. Such a specific surface area range is very high compared to a simply dense carbon aggregate, and this is due to including macropores and mesopores at the same time.

The carbon aggregate described above forms a carbon-sulfur composite by introducing sulfur to at least a part of an external surface and an inside thereof.

As the sulfur capable of being used, various sulfurs used in lithium-sulfur batteries may be used, and elemental sulfur ($S_8$), sulfur series compounds or mixtures thereof are included. The sulfur series compound may be specifically selected from the group consisting of solid $Li_2S_n$ (n≥1)-dissolved catholytes, organosulfur compounds and carbon-sulfur polymers $[(C_2S_x)_n, x=2.5$ to $50, n≥2]$.

The carbon-sulfur composite may load sulfur in a high content due to various-sized pores and pores interconnected three-dimensionally and regularly ordered in the structure. Accordingly, when polysulfide having solubility is produced from an electrochemical reaction but is placed inside the carbon-sulfur composite, the three-dimensionally entangled structure is maintained even with polysulfide elution, and a phenomenon of destroying a positive electrode structure may be suppressed. As a result, a lithium-sulfur battery including the sulfur-carbon composite has an advantage of exhibiting high capacity even with high loading. The amount of sulfur loading of the carbon-sulfur composite according to the present invention may be from 1 $mg/cm^2$ to 7 $mg/cm^2$.

In the carbon-sulfur composite, a weight ratio of the carbon aggregate and the sulfur or sulfur compound may be from 9:1 to 1:9, and preferably from 5:5 to 1:9. When the sulfur or sulfur compound content is less than the above-mentioned range, the carbon aggregate content increases, and a specific surface area increases as the carbon content increases, and the amount of binder added needs to be increased when preparing slurry. The increase in the amount of binder added ultimately increases sheet resistance of an electrode and performs a role of an insulator preventing electron migration, which may decline cell performance. When the sulfur or sulfur compound content is greater than the above-mentioned range, sulfur or sulfur compound that does not bind with the carbon aggregate aggregates themselves or re-eluted to the carbon aggregate surface making electron receiving difficult, and direct participation in the electrode reaction may become difficult.

In the carbon-sulfur composite according to the present invention, hierarchical porosity of the carbon aggregate performs a role of an electron migration path, and therefore, increases electron conductivity, enhances electrode capacity, and may perform a role as a contact site of sulfur, and therefore, carbon and sulfur are not separated even when the sulfur is swollen by an electrolyte liquid, which may reduce sulfur outflow to the electrolyte, and battery performance may be enhanced.

Method for Preparing Carbon-Sulfur Composite

As described above, the carbon-sulfur composite according to the present invention is prepared using a preparation method using template particles for forming pores interconnected three-dimensionally and regularly well-ordered (particularly, macropores). Pore structure formation using template particles is known, however, in the present invention, the carbon-sulfur composite is prepared through a spray process so that the process is readily performed, and macropores and mesopores are formed at the same time.

FIG. 1 is a flow chart of a method for preparing the carbon-sulfur composite according to the present invention. The carbon-sulfur composite according to the present invention may be prepared by preparing a dispersion in which template particles and a cylindrical carbon material are mixed (s10); preparing a template particle-carbon composite by spray drying the dispersion (s20); preparing a carbon aggregate by heat treating the template particle-carbon composite (s30); and preparing a carbon-sulfur composite by impregnating sulfur into the carbon aggregate (s40). Hereinafter, each step will be described.

First, a dispersion in which template particles and a cylindrical carbon material are mixed is prepared (s10).

The cylindrical carbon material may be a rod-type or cylindrical nanostructure mentioned above, and may preferably be carbon nanotubes (CNT), and specifically, single-walled carbon nanotubes (SWCNT) or multi-walled carbon nanotubes (MWCNT) may all be used.

The template particles function as a kind of template enabling to form pores, particularly, macropores in the carbon aggregate. In other words, the template particles, template particles having such a nano-level particle diameter, are dispersed into a dispersion and self-assembled due to unique properties of nanoparticles to be aligned in a lattice form, and gap between these lattices are filled with a cylindrical carbon material. Subsequently, the template particles are removed through a follow-up heat treatment process, and pores are formed in this removed site. Herein, due to the particulate properties of the cylindrical carbon material long in one direction, the pores formed after removing the template particles form a hierarchical porosity structure having a three-dimensionally interconnected structure while forming well-ordered macropores.

As the template particles capable of being used, any capable of being commonly used in the art may be used, and particularly, any may be used as long as it may be removed by a heat treatment process.

Nonlimiting examples of the template particles capable of being used in the present invention may be selected from the group consisting of polystyrene, polymethyl methacrylate, polyphenyl methacrylate, polyacrylate, poly-alpha-methylstyrene, poly(1-methylcyclohexyl methacrylate), polycyclohexyl methacrylate, polybenzyl methacrylate, polychlorobenzyl methacrylate, poly(1-phenylcyclohexyl methacrylate), poly(1-phenylethyl methacrylate), polyfurfuryl methacrylate, poly(1,2-diphenylethyl methacrylate), polypentabromophenyl methacrylate, polydiphenylmethyl methacrylate, polypentachlorophenyl methacrylate, copolymers thereof and combinations thereof, and preferably, polystyrene is used.

Particularly, as for the macropore sizes formed in the carbon aggregate of the present invention, the pore sizes may be determined by the particle diameters of the template particles, in terms that the macropores are formed through removing the template particles. Accordingly, considering the macropore sizes, those having a particle diameter of 50 nm or greater, preferably 300 nm to 800 nm, more preferably 400 nm to 700 nm and most preferably 500 nm to 600 nm are used as the template particles.

In addition, porosity and specific surface area of the carbon aggregate are affected by the template particle content, and therefore, the template particles are mixed in 120 parts by weight to 300 parts by weight and preferably in 135 parts by weight to 200 parts by weight with respect to 100 parts by weight of the carbon material. When the content is less than the above-mentioned range, in density inversion, 70% by weight or greater of sulfur may not be included inside the carbon material when back calculating density, and when the content is greater than above-mentioned range, strength of the structure itself including excessive pores becomes weak leading to a problem in that maintaining an electrode structure is difficult.

A dispersion medium used for preparing a dispersion of the cylindrical carbon material and the template particles may be one or more types selected from the group consisting of water, alcohol, benzene, toluene, pyridine, acetone, tetrahydrofuran (THF) and dimethylformaldehyde (DMF), and preferably, water is used to prepare an aqueous dispersion.

Herein, the centration of the dispersion may be controlled by various parameters. However, the dispersion contains the cylindrical carbon material in a concentration of 10 g/liter to 50 in order to be readily used in a spraying device, and quickly dried while readily removing the dispersion medium. Further preferably, the dispersion contains the cylindrical carbon material in a concentration of 10 g/liter to 30 g/liter.

After that, a template particle-carbon composite is prepared by spray drying the dispersion (s20).

The spray drying method used according to one embodiment of the present invention may be carried out by forming a liquid drop through spraying by supplying the precursor dispersion into a spraying device, and then drying the liquid drop. Herein, the spray drying device may include a spraying device (liquid drop generation device), a reactor and a collecting unit, but is not limited thereto.

Herein, the spray drying may use a method of spraying at room temperature/atmospheric pressure, pressurized spraying or electrostatic spraying, and is not particularly limited in the present invention. As one example, the pressurized spraying is a method of preparing particles through a diffusion dryer after forming a liquid drop by pressurized spraying the dispersion through a pressurized sprayer, and then. In addition, the electrostatic spraying is a method of preparing particles through a diffusion dryer after forming a liquid drop through an electrostatic spray nozzle using a high voltage generator.

When preparing using the spray drying method according to the present invention, a hierarchical porosity structure may be prepared using a single process, and specific surface area and average pore size of the carbon aggregate are readily controlled depending on the process condition.

According to one embodiment of the present invention, a liquid drop having an average diameter of 0.5 μm to 100 μm may be formed by the spraying, and by the drying, a dispersion medium included in the liquid drop may be removed. The diameter of the liquid drop is preferably in a range of 0.5 μm to 100 μm, and more preferably in a range of 5 μm to 30 μm. When the diameter of the liquid drop is less than 0.5 μm, the size of the produced carbon aggregate may become too small, and when the diameter of the liquid drop is greater than 100 μm, the size of the produced carbon aggregate may become too large causing a problem.

The drying process is not particularly limited as long as it is carried out at a temperature higher than a temperature for materials forming the liquid drop to be converted to particles (that is, aggregate), and is preferably carried out by heat treatment in a temperature range of preferably 50° C. to 180° C., and more preferably 60° C. to 150° C. capable of sufficiently removing the dispersion medium. Herein, the drying temperature may vary depending on the dispersion medium used.

The dried template particle-carbon composite is obtained in a particle form (powder), and is collected through a collector in order to remove the template particles.

Next, a carbon aggregate having a hierarchical porosity structure is prepared by removing the template particles through heat treating the template particle-carbon composite (s30).

The heat treatment temperature may be selected in a temperature range capable of removing the used template particles, and although not particularly limited thereto, the heat treatment time is properly selected in a time range sufficient to remove all the template particles. For example, the heat treatment temperature may be in a range of 400° C. to 1200° C., specifically 700° C. to 1100° C. and more specifically 800° C. to 1000° C., and the heat treatment time may be in a range of 1 hour or longer, specifically 1 hour to 10 hours, however, the heat treatment temperature and the heat treatment time are not limited thereto.

Herein, the heat treatment may be carried out under reduced atmosphere that does not include oxygen, that is, atmosphere including inert gas such as helium, neon or argon, hydrogen, nitrogen, or SF6 gas, and may be for removing the template particles through heat treatment under the reduced atmosphere, but is not limited thereto.

In order to uniformize the particle sizes before uniformizing the particle sizes, the prepared carbon aggregate may go through, as necessary, a method such as a dry ball mill method, a dry jet mill method or a dry dyno mill method.

The diameter of the carbon aggregate provided in the present invention is maximally 500 μm, and the milling may be carried out one or more times in order to maintain the above-mentioned range, and as the specific method, methods commonly used in the art may be used.

Next, a carbon-sulfur composite is prepared by impregnating sulfur into the carbon aggregate (s40).

The sulfur impregnation is not particularly limited in the present invention, and known methods may be used.

The impregnating of sulfur or sulfur compound (S10) may be carried out by uniformly mixing the carbon aggregate and sulfur or sulfur compound power, then heating the mixture, and impregnating the melted sulfur or sulfur compound into the carbon aggregate.

Herein, the sulfur or sulfur compound may be impregnated by flowing into the carbon aggregate close by through a capillary phenomenon.

The heating temperature may be 15° C. to 180° C. or lower, and more specifically 150° C. to 160° C. or lower. According to one embodiment, the sulfur being uniformly coated around the carbon aggregate rather than voids between the carbon aggregate may be identified through an energy dispersive spectroscopy (EDS) analysis.

The heating time may be controlled depending on the content of the sulfur or sulfur compound and the content of the carbon aggregate, and for example, may be 10 seconds or longer or 30 seconds or longer, and 2 hours or shorter, 1 hour or shorter, 30 minutes or shorter or 10 minutes or shorter.

When the melting temperature is lower than 115° C. the sulfur or sulfur compound particles are not melted, and the sulfur or sulfur compound may not be properly impregnated into the carbon aggregate.

The impregnating of sulfur or sulfur compound (S10) may be carried out by dissolving sulfur or sulfur compound in an organic solvent, and then growing the sulfur or sulfur compound through adding the carbon aggregate.

The organic solvent may be one selected from the group consisting of ethanol, toluene, benzene, N-methyl-2-pyrrolidone (NMP), dimethyl sulfoxide (DMSO), acetone, chloroform, dimethylformamide, cyclohexane, tetrahydrofuran and methylene chloride, or a mixed solvent of two or more thereof.

The impregnating of sulfur or sulfur compound (S10) may be carried out by mixing the carbon aggregate and sulfur or sulfur compound powder and impregnating using a ball mill method.

The mixing method may be carried out by placing in a powder mixer for a certain period of time. Herein, the mixing time may be 10 minutes or longer or 30 minutes or longer, and 10 hours or shorter, 5 hours or shorter or 2 hours or shorter.

Positive Electrode for Lithium-Sulfur Battery

The carbon-sulfur composite provided in the present invention may be preferably used as a positive electrode active material of a lithium-sulfur battery.

A lithium-sulfur battery includes sulfur as a positive electrode active material, and this has a problem of lithium polysulfide elution during charge and discharge. The carbon-sulfur composite according to the present invention may load sulfur in a high content due to pores with various sizes and pores interconnected three-dimensionally and regularly ordered in the structure. Accordingly, a three-dimensionally entangled structure is maintained even with polysulfide elution, and a phenomenon of destroying a positive electrode structure may be suppressed. As a result, a lithium-sulfur battery including the sulfur-carbon nanotube composite has an advantage of obtaining high capacity even with high loading.

The positive electrode is prepared by coating a composition for forming a positive electrode active material layer on a positive electrode current collector and drying the result. The composition for forming a positive electrode active material layer may be prepared by mixing the carbon-sulfur composite described above, a conductor, a binder and a solvent.

Specifically, in order to additionally provide conductivity to the prepared carbon-sulfur composite, a conductor may be further added to the positive electrode composition. The conductor performs a role for electrons to smoothly migrate in the positive electrode, and is not particularly limited as long as it has excellent conductivity and is capable of providing a large surface area without inducing chemical changes to a battery, however, carbon-based materials are preferably used.

As the carbon-based material, one type selected from the group consisting of graphite-based such as natural graphite, artificial graphite, expanded graphite or graphene, active carbon-based, carbon black-based such as channel black, furnace black, thermal black, contact black, lamp black or acetylene black; carbon fiber-based, carbon nanostructures such as carbon nanotubes (CNT) or fullerene, and combinations thereof may be used.

In addition to the carbon-based material, metallic fibers such as metal mesh; metallic powders such as copper (Cu), silver (Ag), nickel (Ni) and aluminum (Al); or organic conductive materials such as polyphenylene derivatives may also be used depending on the purpose. The conductive materials may be used either alone or as a mixture.

In addition, in order to provide adhesion for a current collector to the positive electrode active material, a binder may be further included in the positive electrode composition. The binder needs to be favorably dissolved in a solvent, and needs to have proper impregnability of an electrolyte liquid as well as favorably forming a conductive network with the positive electrode active material and the conductor.

The binder capable of being used in the present invention may be all binders known in the art, and specifically, may be one type selected from the group consisting of fluororesin-based binders including polyvinylidene fluoride (PVdF) or polytetrafluoroethylene (PTFE); rubber-based binders including styrene-butadiene rubber, acrylonitrile-butadiene rubber or styrene-isoprene rubber; cellulose-based binders including carboxymethylcellulose (CMC), starch, hydroxypropylcellulose or regenerated cellulose; polyalcohol-based binders; polyolefin-based binders including polyethylene or polypropylene; polyimide-based binders, polyester-based binders and silane-based binders, or mixtures or copolymers of two or more types thereof, but is not limited thereto.

The content of the binder resin may be from 0.5% by weight to 30% by weight based on the total weight of the positive electrode for a lithium-sulfur battery, but is not limited thereto. When the binder resin content is less than 0.5% by weight, physical properties of the positive electrode may decline eliminating the positive electrode active material and the conductor, and when the content is greater than 30% by weight, ratios of the active material and the conductor relatively decrease in the positive electrode reducing battery capacity.

The solvent for preparing the positive electrode composition for a lithium-sulfur battery in a slurry state needs to be readily dried, and most preferably maintains the positive electrode active material and the conductor in a dispersed state without dissolution while favorably dissolving the binder. When the solvent dissolves the positive electrode active material, sulfur goes under in the slurry since sulfur has high specific gravity (D=2.07) in the slurry, and sulfur is crowded on the current collector when coating causing a problem in the conductive network, and battery operation tends to have a problem.

As the solvent according to the present invention, water or organic solvents may be used, and as the organic solvent, organic solvents including one or more types selected from the group consisting of dimethylformamide, isopropyl alcohol, acetonitrile, methanol, ethanol and tetrahydrofuran may be used.

As for the mixing of the positive electrode composition, common methods may be used for the stirring using common mixers such as a paste mixer, a high shear mixer and a homo-mixer.

The positive electrode for a lithium-sulfur battery may be formed by coating the positive electrode composition on a current collector, and vacuum drying the result. The slurry may be coated on the current collector to a proper thickness depending on the viscosity of the slurry and the thickness of the positive electrode to form, and preferably, the thickness may be properly selected in the range of 10 μm to 300 μm.

Herein, the method of coating the slurry is not limited, and for example, methods of doctor blade coating, dip coating, gravure coating, slit die coating, spin coating, comma coating, bar coating, reverse roll coating, screen coating, cap coating or the like may be carried out for the preparation.

The positive electrode current collector is not particularly limited as long as it may be prepared to generally have a thickness of 3 μm to 500 μm, and has high conductivity without inducing chemical changes to a battery. For example, conductive metals such as stainless steel, aluminum, copper or titanium may be used, and preferably, an aluminum current collector may be used. Such a positive electrode current collector may have various forms such as films, sheets, foil, nets, porous bodies, foams or non-woven fabrics.

Lithium-Sulfur Battery

As one embodiment of the present invention, the lithium-sulfur battery may include the positive electrode for a lithium-sulfur battery described above; a negative electrode including lithium metal or an lithium alloy as a negative electrode active material; a separator provided between the positive electrode and the negative electrode; and an electrolyte impregnated into the negative electrode, the positive electrode and the separator, and including a lithium salt and an organic solvent.

The negative electrode may use a material capable of reversibly intercalating or deintercalating lithium ions ($Li^+$), a material capable of reversibly forming a lithium-containing compound by reacting with lithium ions, lithium metal or a lithium alloy as a negative electrode active material. Examples of the material capable of reversibly intercalating or deintercalating lithium ions may include crystalline carbon, amorphous carbon or a mixture thereof. Examples of the material capable of reversibly forming a lithium-containing compound by reacting with lithium ions may include tin oxide, titanium nitrate or silicon. Examples of the lithium alloy may include alloys of lithium and metals selected from the group consisting of Na, K, Rb, Cs, Fr, Be, Mg, Ca, Sr, Ba, Ra, Al and Sn.

In addition, while charging and discharging a lithium-sulfur battery, sulfur used as a positive electrode active material may be changed to an inactive material and attached on a lithium negative electrode surface. Inactive sulfur means sulfur that has gone through various electrochemical or chemical reactions and is not able to participate in an electrochemical reaction of a positive electrode any more, and the inactive sulfur formed on the lithium negative electrode surface has an advantage of performing a role of a protective layer of the lithium negative electrode. Accordingly, lithium metal and inactive sulfur formed on this lithium metal, for example, lithium sulfide, may be used as the negative electrode.

The negative electrode of the present invention may additionally further include, in addition to the negative electrode active material, a pretreatment layer formed with a lithium ion conductive material, and a lithium metal protective layer formed on the pretreatment layer.

The separator provided between the positive electrode and the negative electrode separates or insulates the positive electrode and the negative electrode from each other, and enables lithium ion transfer between the positive electrode and the negative electrode, and may be formed with porous non-conductive or insulating materials. As an insulator having high ion permeability and mechanical strength, such a separator may be an independent member such as a thin film or a film, or a coating layer added to the positive electrode and/or the negative electrode. In addition, when using a solid electrolyte such as a polymer as the electrolyte, the solid electrolyte may also be used as the separator.

The separator preferably has a pore diameter of generally 0.01 μm to 10 μm and a thickness of generally 5 μm to 300 μm, and as such a separator, a glass electrolyte, a polymer electrolyte, a ceramic electrolyte or the like may be used. For example, olefin-based polymers having chemical resistance and hydrophobicity such as polypropylene, glass fiber, or sheets, non-woven fabrics, kraft papers and the like made of polyethylene and the like are used. Typical examples commercially available may include Celgard series ($Celgard^R$ 2400, 2300, product of Hoechest Celanese Corp.), polypropylene separator (product of Ube Industries Ltd. or product of Pall RAI), polyethylene series (Tonen or Entek) and the like.

The electrolyte separator in a solid state may include a non-aqueous organic solvent in approximately less than 20% by weight, and in this case, a proper gelling agent may be further included in order to reduce fluidity of the organic solvent. Typical examples of such a gelling agent may include polyethylene oxide, polyvinylidene fluoride, polyacrylonitrile and the like.

The electrolyte impregnated into the negative electrode, the positive electrode and the separator is, as a lithium salt-containing non-aqueous electrolyte, formed with a lithium salt and an electrolyte liquid, and as the electrolyte liquid, non-aqueous organic solvents, organic solid electrolytes, inorganic solid electrolytes and the like are used.

Examples of the lithium salt of the present invention may include, as a material favorably dissolved in a non-aqueous organic solvent, may include one or more selected from the group consisting of LiSCN, LiCl, LiBr, LiI, $LiPF_6$, $LiBF_4$, $LiSbF_6$, $LiAsF_6$, $LiB_{10}Cl_{10}$, $LiCH_3SO_3$, $LiCF_3SO_3$, $LiCF_3CO_2$, $LiClO_4$, $LiAlCl_4$, $Li(Ph)_4$, $LiC(CF_3SO_2)_3$, $LiN(FSO_2)_2$, $LiN(CF_3SO_2)_2$, $LiN(C_2F_5O_2)_2$, $LiN(SFO_2)_2$, $LiN(CF_3CF_2SO_2)_2$, chloroborane lithium, lower aliphatic carboxylic acid lithium, lithium tetraphenylborate, lithium imide and combinations thereof.

The concentration of the lithium salt may be from 0.2 M to 2 M, specifically from 0.6 M to 2 M and more specifically from 0.7 M to 1.7 M depending on various factors such as an accurate composition of the electrolyte solvent mixture, solubility of the salt, conductivity of the dissolved salt, charge and discharge conditions of a battery, a working temperature, and other factors known in the lithium battery field. When used in less than 0.2 M, conductivity of the electrolyte may decrease causing decline in the electrolyte performance, and when used in greater than 2 M, viscosity of the electrolyte increases leading to a decrease in the lithium ion (Li$^+$) mobility.

The non-aqueous organic solvent needs to favorably dissolve the lithium salt, and examples of the non-aqueous organic solvent of the present invention may include aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydroxy franc, 2-methyl tetrahydrofuran, dimethyl sulfoxide, 1,3-dioxolane, 4-methyl-1,3-dioxene, diethyl ether, formamide, dimethylformamide, dioxolane, acetonitrile, nitromethane, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate or ethyl propionate may be used, and the organic solvent may be used either alone or as a mixture of two or more organic solvents.

As the organic solid electrolyte, for example, polyethylene derivatives, polyethylene oxide derivatives, polypropylene oxide derivatives, phosphoric acid ester polymers, polyagitation lysine, polyester sulfide, polyvinyl alcohol, polyvinylidene fluoride, polymers including an ionic dissociation group, and the like may be used.

As the inorganic solid electrolyte, for example, nitrides, halides, sulfates and the like of Li such as $Li_3N$, LiI, $LiSNI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH or $Li_3PO_4$—$Li_2S$—$SiS_2$ may be used.

With the purpose of improving charge and discharge properties and flame retardancy, for example, pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride or the like may also be added to the electrolyte of the present invention. In some cases, halogen-containing solvents such as carbon tetrachloride and trifluoroethylene may be further included in order to provide nonflammability, carbon dioxide gas may be further included in order to enhance high temperature storage properties, and fluoro-ethylene carbonate (FEC), propene sultone (PRS), fluoro-propylene carbonate (FPC) and the like may be further included.

The electrolyte may be used as a liquid-state electrolyte or as an electrolyte separator form in a solid state. When using as a liquid-state electrolyte, a separator formed with porous glass, plastics, ceramics or polymers is further included as a physical separator having a function of physically separating electrodes.

Hereinafter, the present invention will be described in detail with reference to examples. However, examples according to the present invention may be modified to various different forms, and the scope of the present invention is not to be construed as being limited to the examples described below. The examples of the present invention are provided to those having average knowledge in the art in order to more fully describe the present invention.

Example 1

Step 1. Preparation of Carbon Nanotube-Sulfur (CNT-S) Composite Having Hierarchical Porosity Structure An aqueous dispersion of multi-walled carbon nanotubes (MWCNT, diameter: 10 nm to 20 nm) and a polystyrene (PS, diameter: 500 nm to 600 nm) colloidal solution were mixed in a ratio of CNT:PS=1 g:1 g to prepare an aqueous dispersion.

The dispersion was spray dried (Labplant Ltd., SD-Basic) and then dried at 135° C. to prepare a polystyrene-carbon nanotube (PS-CNT) composite. The PS-CNT composite was collected, and then heat treated for 2 hours at 500° C. under argon (Ar) atmosphere to remove PS, and a CNT aggregate was prepared.

3 g of sulfur (S) powder was mixed to I g of the obtained CNT aggregate, and impregnated (melt diffusion) for 12 hours at 155° C. to prepare a CNT-S composite.

Step 2. Preparation of Lithium-Sulfur Battery Positive Electrode

After mixing the CNT-S composite:denka black (DB-100):carboxymethylcellulose (CMC):styrene butadiene rubber (SBR) in a weight ratio 80:10:5:5, the result was dispersed into N-methyl-2-pyrrolidone (NMP) to prepare positive electrode active material slurry. The prepared positive electrode active material slurry was coated on one surface of an aluminum current collector (20 µm) using a doctor blade method, and the result was dried for 24 hours or longer in a 65° C. convection oven to prepare a positive electrode. The dried electrode was cut to a 12 pi circular disk form, and used as a positive electrode of a lithium-sulfur battery.

Step 3. Manufacture of Lithium-Sulfur Battery

Using the prepared positive electrode, a half-cell of a CR2032 coin cell was manufactured. As a negative electrode, disk-type lithium metal having a diameter of 15 mm was used, polypropylene (PP) having a diameter of 18 mm was used as a separator, and an electrolyte including 1,3-dioxolane (DOL):dimethyl ether (DME)=1:1 (v/v %), 1 M LiTFSi and 0.5 M $LiNO_3$ was used.

Example 2

A CNT-S composite was prepared in the same manner as in Step 1 of Example 1 except that the CNT and the PS were mixed in a ratio of 1 g:1.5 g to prepare the CNT aggregate.

After that, a positive electrode and a lithium-sulfur battery were prepared in the same manner as in Step 2 and Step 3 of Example 1.

Comparative Example 1

Step 1. Preparation of Simply Dense CNT-S Composite

An aqueous dispersion of multi-walled carbon nanotubes (MWCNT, diameter: 10 nm to 20 nm) was spray dried under the same condition as in Example 1, and after that, heat treated in the same manner as in Example 1 to prepare a simply dense CNT aggregate, and then sulfur was impregnated to prepare a simply dense CNT-S composite.

Step 2. Preparation of Lithium-Sulfur Battery Positive Electrode

A positive electrode was prepared in the same manner as in Example 1.

Step 3. Manufacture of Lithium-Sulfur Battery

A lithium-sulfur battery was manufactured in the same manner as in Example 1.

Figure 2:
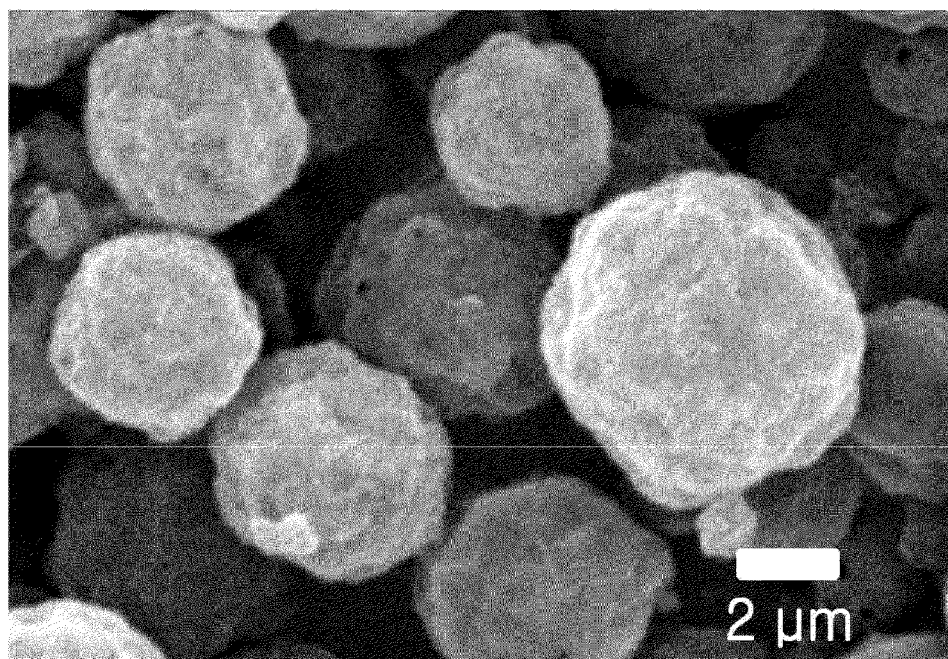
FIG. 2 shows a scanning electron microscope (SEM) image of a carbon nanotube (CNT) aggregate having a hierarchical porosity structure prepared in Example 1 according to the present invention.

<Experimental Example 1> Analysis on Structure, Components and Form of CNT Aggregate FIG. 2 shows a scanning electron microscope (SEM) image of the CNT aggregate having a hierarchical porosity structure prepared in Example 1. Through the SEM image, the CNT aggregate having a size of 4 µm to 7 µm was identified, and inner macropores having a diameter of approximately 500 nm to 600 nm were identified.

Figure 3:
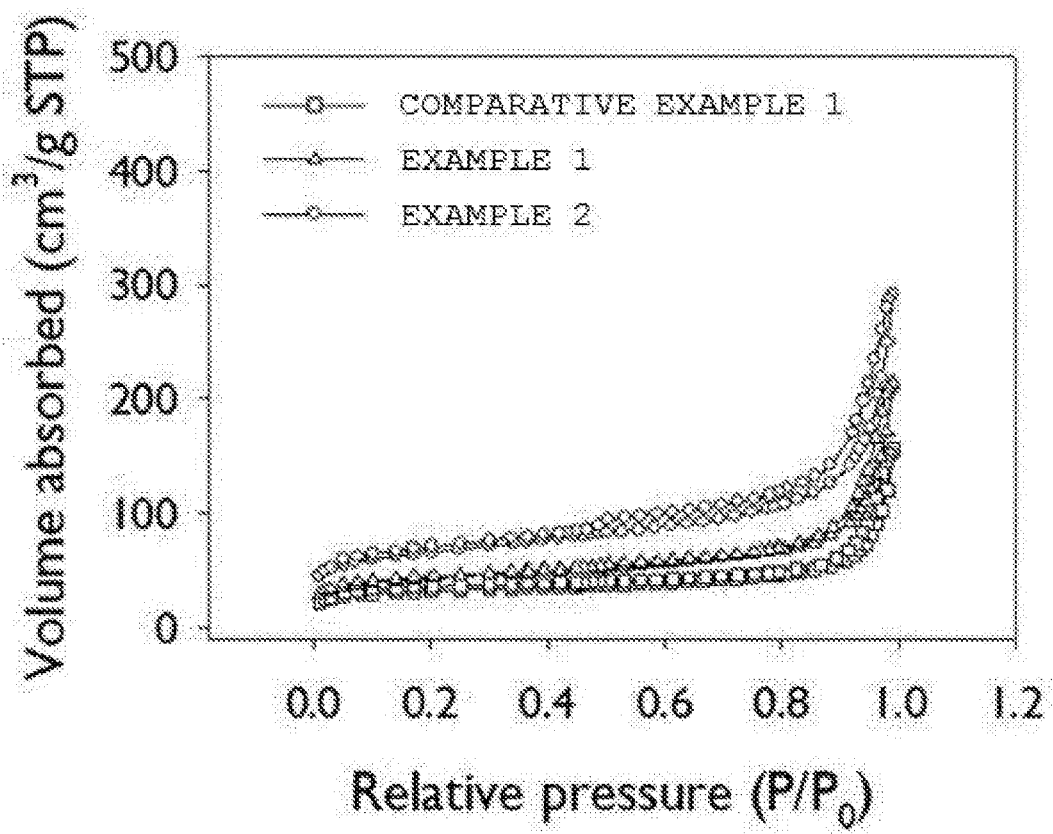
FIG. 3 shows specific surface area data of CNT aggregates prepared in Examples 1 and 2 and Comparative Example 1 according to the present invention.

FIG. 3 shows data presenting a difference in the specific surface area depending on the presence of a hierarchical porosity structure of the CNT aggregates prepared in Examples 1 and 2 and Comparative Example 1 through a Brunauer-Emmett-Teller (BET) analysis. It was identified that, whereas the simply dense CNT aggregate of Comparative Example 1 had a specific surface area of approximately 118 m²/g, the specific surface areas of the CNT aggregates having a hierarchical porosity structure of Example 1 and Example 2 were 172 m²/g and 227 m²/g, respectively, which were an increase closer to approximately 1.5 times to 2 times. This means that the specific surface area increases as the content of PS, template particles, increases, and when forming a composite with sulfur, space and area into which the sulfur is stably impregnated are provided.

Figure 4:
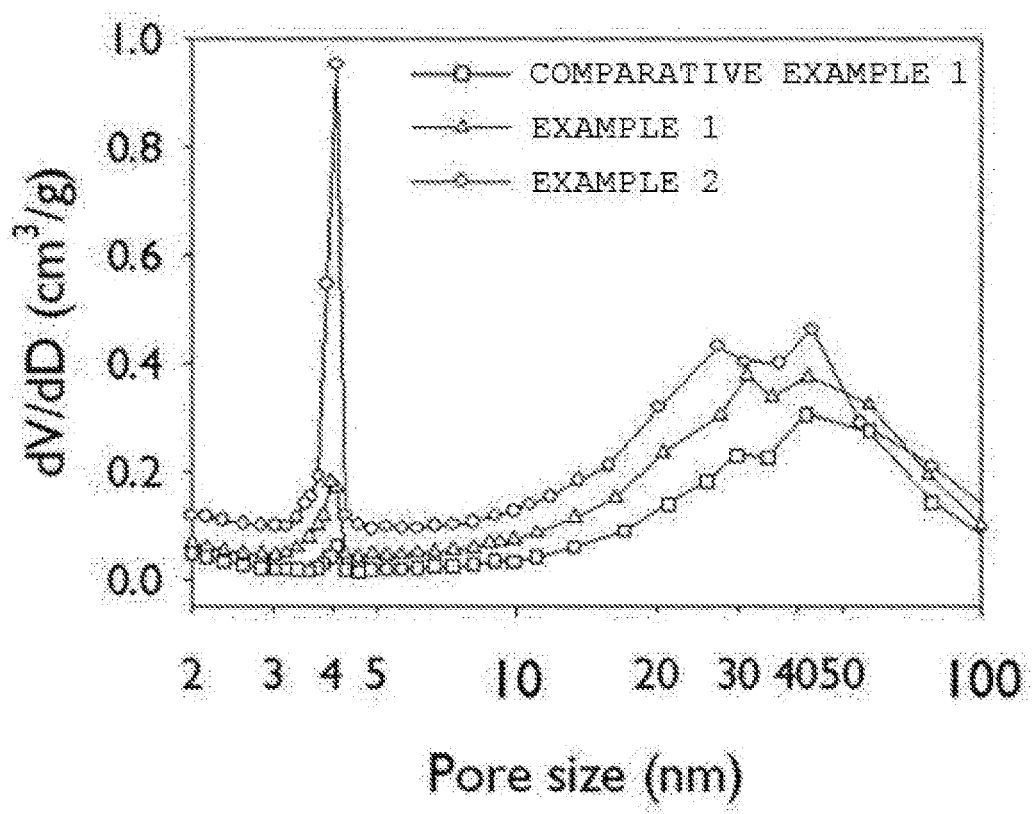
FIG. 4 shows average pore size data of CNT aggregates prepared in Example 1 and 2 and Comparative Example 1 according to the present invention.

FIG. 4 shows data presenting average pore sizes of the CNT aggregates prepared in Examples 1 and 2 and Comparative Example 1 through a Barrett-Joyner-Halenda (BJH) analysis. It was identified that 4 nm pores and pores between and 10 nm to 100 nm were developed in the CNT aggregates having a hierarchical porosity structure of Example 1 and Example 2, and particularly, it was identified that 4 nm pores were more developed in the CNT aggregate of Example 2 having a relatively higher content of PS, template particles. Through such results, it was seen that mesopores were hierarchically formed together with inner macropores having a 500 to 600 nm diameter identifiable with the SEM image of FIG. 3, and it was seen that template particles affected mesopore formation as well as providing macropores.

Figure 5:
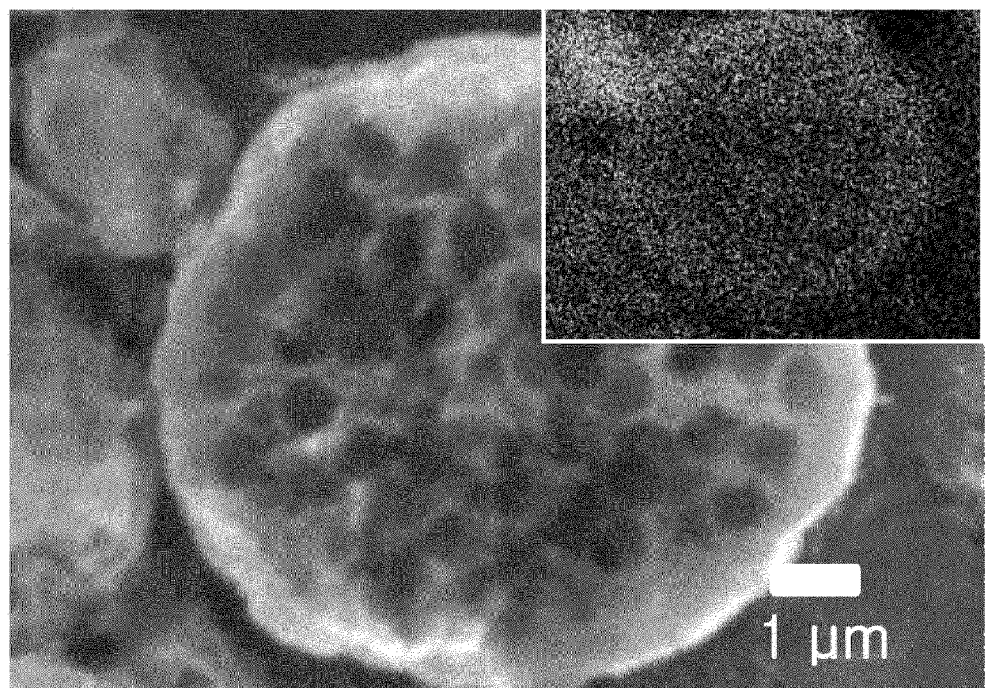
FIG. 5 shows a SEM image and a sulfur (S) element mapping result image of an X-ray spectroscopic analysis (EDX) for a CNT-S composite having a hierarchical porosity structure prepared in Example 1 according to the present invention.

<Experimental Example 2> Analysis on Structure. Components and Form of CNT-S Composite FIG. 5 shows a SEM image and a sulfur element mapping result image of an X-ray spectroscopic analysis (EDX) for the CNT-S composite having a hierarchical porosity structure prepared in Example 1. Through the EDX, it was identified that sulfur was uniformly distributed in the CNT aggregate having a hierarchical porosity structure.

Figure 6:
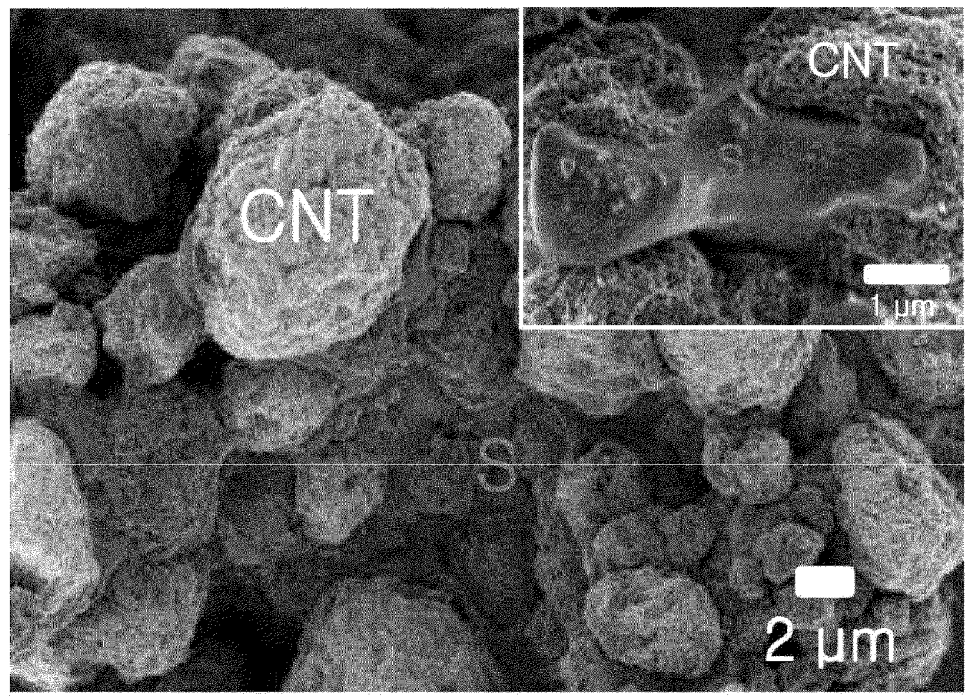
FIG. 6 shows a SEM image of a simply dense CNT-S composite prepared in Comparative Example 1 according to the present invention.
Figure 7:
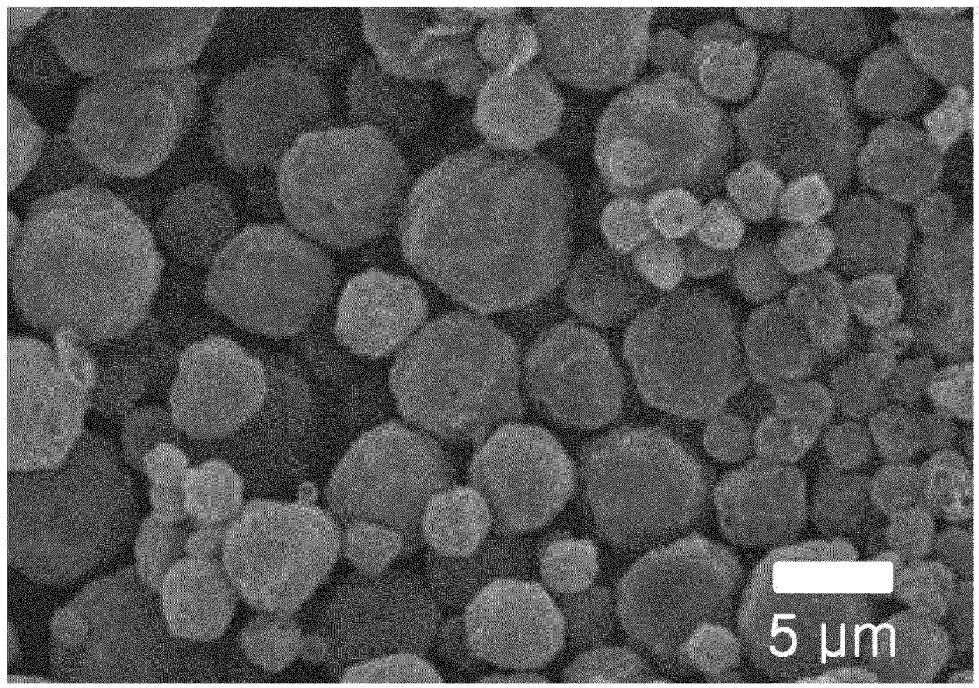
FIG. 7 shows a SEM image of a CNT-S composite having a hierarchical porosity structure prepared in Example 1 according to the present invention.

FIG. 6 shows a SEM image of the simply dense CNT-S composite prepared in Comparative Example 1, and FIG. 7 shows a SEM image of the CNT-S composite having a hierarchical porosity structure prepared in Example 1. After sulfur was composited, sulfur particles that were not composited into the particles were identified between the particles in the simply dense CNT aggregate as shown in FIG. 6, whereas, as shown in FIG. 7, sulfur that was not composited into the particles was not identified in the CNT aggregate having a hierarchical porosity structure. In other words, it was seen that sulfur was able to be stably impregnated in the hierarchical porosity structure.

Figure 8:
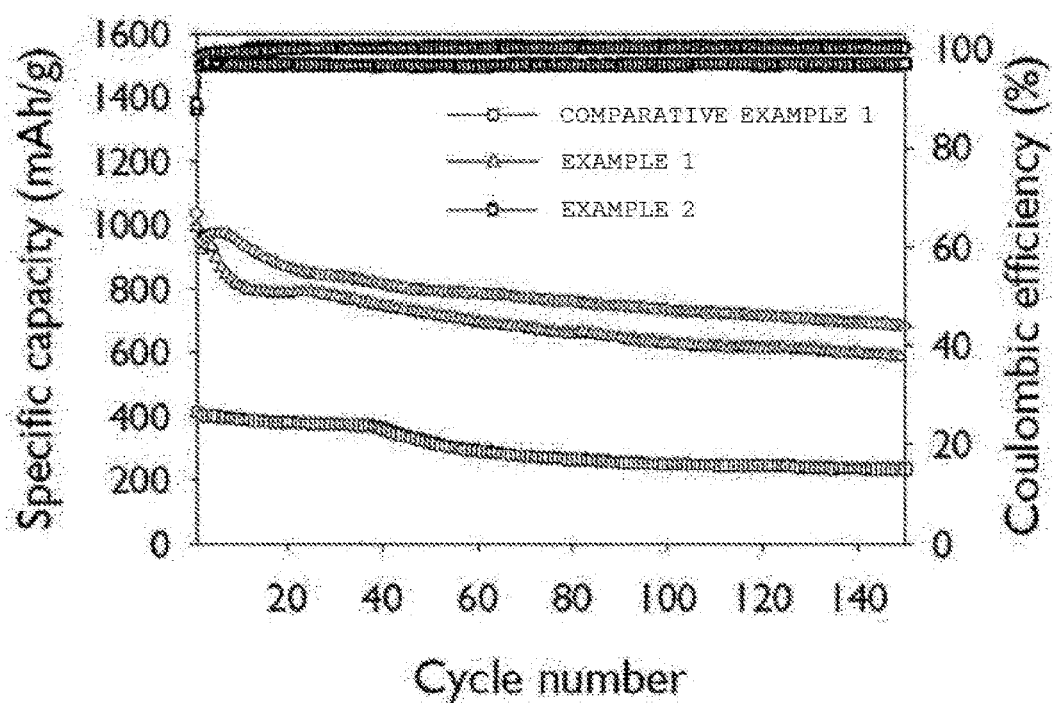
FIG. 8 shows capacity property and coulombic efficiency data of lithium-sulfur batteries of Example 1 and 2 and Comparative Example 1 according to the present invention.

<Experimental Example 3> Analysis on Electrochemical Properties of Lithium-Sulfur Battery For the lithium-sulfur batteries manufactured in Examples 1 and 2 and Comparative Example 1, capacity properties and coulombic efficiency were measured with a charge and discharge voltage range of 1.5 V to 2.8 V, and with a rate of 2 C of discharge and 2 C of charge, and the results are shown in each of the following Table 1 and FIG. 8.

TABLE 1

| | Initial Capacity (Ah/g) | Discharge Capacity (Ah/g) | Capacity after 150 Cycles (Ah/g) | Coulombic Efficiency (%) |
|---|---|---|---|---|
| Example 1 | 995 | 878 | 587 | ~100 |
| Example 2 | 1034 | 917 | 681 | ~100 |
| Comparative Example 1 | 415 | 363 | 232 | 96.8 |

When referring to Table 1 and FIG. 8, it was identified that the lithium-sulfur batteries including the CNT-S composites of Example 1 and Example 2 having a hierarchical porosity structure as a positive electrode had initial capacity and discharging capacity increased to approximately 2.4 times to 2.5 times compared to the lithium-sulfur battery including the simply dense CNT-S composite of Comparative Example 1 as a positive electrode, and an improvement in the capacity after 150 cycles was also identified.

As a result, it was identified that, when using the CNT-S composite according to the present invention as a positive electrode material of a lithium-sulfur battery, an electron migration path was secured due to a hierarchical porosity structure, which increased electron conductivity and thereby enhanced charge and discharge capacity of the battery.

The invention claimed is:

1. A carbon-sulfur composite comprising:
    a carbon aggregate having a hierarchical porosity structure comprised with pores interconnected three-dimensionally and ordered,
    wherein the carbon aggregate has a structure in which cylindrical carbon materials are entangled with each other; and
    sulfur introduced to at least a part of an external surface and an inside of the carbon aggregate,
    wherein the carbon aggregate comprises macropores having a diameter of 300 nm to 800 nm and mesopores having a diameter of 2 nm to 50 nm,
    wherein the mesopores and macropores are formed between the cylindrical carbon materials, and
    wherein the macropores are formed by removal of template particles, and
    wherein the carbon aggregate has an average particle diameter of 1 µm to 500 µm.

2. The carbon-sulfur composite of claim 1, wherein the cylindrical carbon materials are at least one selected from the group consisting of carbon nanotubes (CNT), graphite nanofibers (GNF), carbon nanofibers (CNF) and activated carbon fibers (ACF).

3. The carbon-sulfur composite of claim 1, wherein the carbon aggregate has a porosity of 10% to 70%, and a total BET specific surface area of 50 m²/g to 1000 m²/g.

4. The carbon-sulfur composite of claim 1, wherein the sulfur includes one or more types selected from the group consisting of elemental sulfur and sulfur series compounds.

5. The carbon-sulfur composite of claim 1, comprising the carbon aggregate and the sulfur in a weight ratio of 9:1 to 1:9.

6. A method for preparing the carbon-sulfur composite according to claim 1, comprising:
    i) preparing a dispersion in which template particles and the cylindrical carbon materials are mixed;
    ii) preparing a template particle-carbon composite by spray drying the dispersion;
    iii) preparing the carbon aggregate by heat treating the template particle-carbon composite; and iv) preparing the carbon-sulfur composite by impregnating sulfur into the carbon aggregate.

7. The method for preparing the carbon-sulfur composite of claim 6, wherein the template particles are one type selected from the group consisting of polystyrene, polymethyl methacrylate, polyphenyl methacrylate, polyacrylate, poly-alpha-methylstyrene, poly(1-methylcyclohexyl methacrylate), polycyclohexyl methacrylate, polybenzyl methacrylate, polychlorobenzyl methacrylate, poly(1-phenylcyclohexyl methacrylate), poly(1-phenylethyl methacrylate), polyfurfuryl methacrylate, poly(1,2-diphenylethyl methacrylate), polypentabromophenyl methacrylate, polydiphenylmethyl methacrylate, polypentachlorophenyl methacrylate, copolymers thereof and combinations thereof.

8. The method for preparing the carbon-sulfur composite of claim 6, wherein the template particles have an average particle diameter of 50 nm or greater.

9. The method for preparing the carbon-sulfur composite of claim 6, wherein a dispersion medium of the dispersion is one or more type selected from the group consisting of water, alcohol, benzene, toluene, pyridine, acetone, tetrahydrofuran (THF) and dimethylformaldehyde (DMF).

10. The method for preparing the carbon-sulfur composite of claim 6, wherein the spray drying is carried out using a method of spraying at room temperature/atmospheric pressure, pressurized spraying or electrostatic spraying.

11. The method for preparing the carbon-sulfur composite of claim 6, wherein the heat treatment is carried out at 400° C. to 1200° C.

12. A lithium-sulfur battery comprising:
a positive electrode;
a negative electrode; and
an electrolyte,
wherein the positive electrode includes the carbon-sulfur composite of claim 1.

13. The carbon-sulfur composite of claim 1, wherein the carbon aggregate has a total BET specific surface area of 100 $m^2/g$ to 500 $m^2/g$.

14. The carbon-sulfur composite of claim 1, wherein the carbon aggregate has a total BET specific surface area of 200 $m^2/g$ to 300 $m^2/g$.

* * * * *